US006190098B1

(12) United States Patent
Fujita et al.

(10) Patent No.: US 6,190,098 B1
(45) Date of Patent: Feb. 20, 2001

(54) NUMERICAL CONTROL SYSTEM OF MACHINE TOOL

(75) Inventors: Jun Fujita, Mishima; Kouichi Katoh, Numazu, both of (JP)

(73) Assignee: Toshiba Kikai Kabushiki Kaisha, Tokyo-to (JP)

(*) Notice: Under 35 U.S.C. 154(b), the term of this patent shall be extended for 0 days.

(21) Appl. No.: 09/293,844

(22) Filed: Apr. 19, 1999

(30) Foreign Application Priority Data

Apr. 21, 1998 (JP) .................................................. 10-110953

(51) Int. Cl.[7] .............................. B23C 9/00; G06F 15/46; G08B 21/00; B24B 49/02; G05B 13/02
(52) U.S. Cl. ........................ 409/132; 318/561; 340/680; 409/141; 451/11; 700/173; 700/177
(58) Field of Search ............................ 409/80, 131, 132; 700/141, 177, 32, 175, 173; 408/143; 451/11, 27; 340/680, 683; 318/561, 566, 571

(56) References Cited

U.S. PATENT DOCUMENTS

| 3,576,976 | * | 5/1971 | Russo et al. ...................... 340/146.3 |
| 3,634,664 | * | 1/1972 | Valek ................................ 409/141 X |
| 3,665,493 | * | 5/1972 | Glowzewski ......................... 318/571 |
| 4,019,288 | * | 4/1977 | Moritomo ......................... 409/141 X |
| 4,604,834 | * | 8/1986 | Thompson ........................ 408/141 X |
| 4,636,780 | * | 1/1987 | Thomas et al. ....................... 340/680 |
| 5,170,358 | * | 12/1992 | Delio ................................ 340/680 X |
| 5,784,273 | * | 7/1998 | Madhavan ............................. 702/56 |

* cited by examiner

Primary Examiner—William Briggs
(74) Attorney, Agent, or Firm—Pillsbury Madison & Sutro, LLP

(57) ABSTRACT

A numerical control system for a machine tool comprises a feed speed setting unit, which outputs a signal of a set feed speed of the machine tool, and a feed speed overriding unit, which outputs a signal of a feed speed overriding according to an input of the feed speed overriding. An interpolation unit connects to the feed speed setting unit and the feed speed overriding unit. The interpolation unit determines a command signal of the feed speed of the machine tool by performing interpolation calculations according to he signal of the set feed speed unit and the signal of the feed speed overriding unit. Based upon its calculations, the interpolation unit outputs a target position of each spindle at each sampling time. The numerical control also comprises a main spindle rotational speed determining unit, which connects to the interpolation unit to change the command signal of a main spindle rotational speed synchronously with the change of the command signal of the feed speed when the command signal of the feed speed is changed at the interpolation unit by the signal of the feed overriding unit.

18 Claims, 3 Drawing Sheets

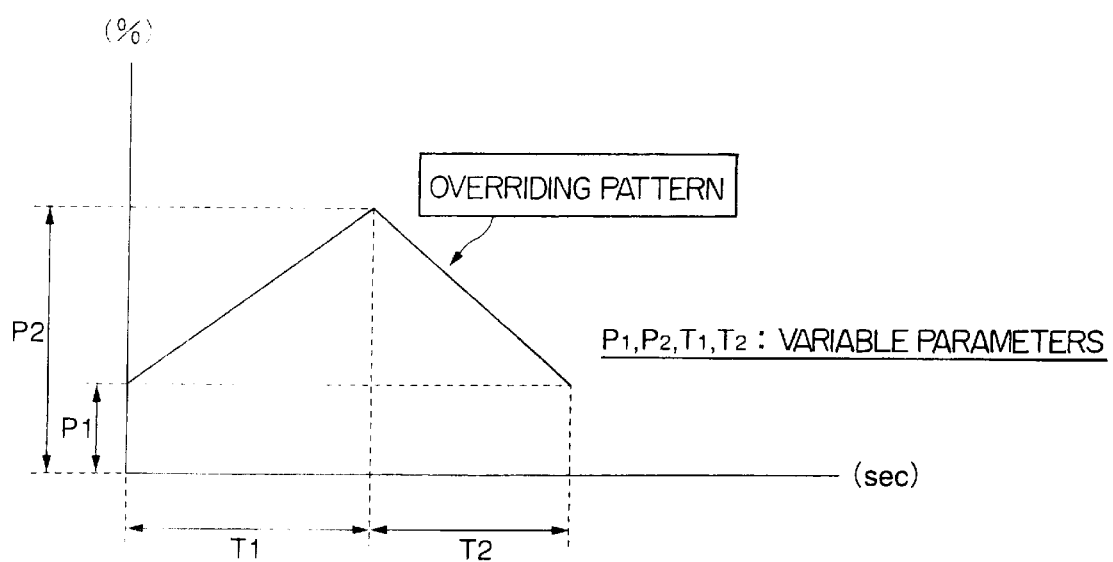
F I G. 3

NUMERICAL CONTROL SYSTEM OF MACHINE TOOL

BACKGROUND OF THE INVENTION

1. Field of the Invention

This invention relates to a numerical control system for a machine tool having a feed speed overriding unit and a main spindle rotational speed overriding unit, in particular, to a numerical control system for a machine tool achieving a satisfactory processing in a state controlled by a feed speed overriding unit and a main spindle rotational speed overriding unit.

2. Description of the Related art

When the work is being processed, for example, during a cutting operation, by a machine tool, the cutting blade of the machine tool intermittently abuts the work piece and makes it vibrate.

If the frequency of the vibration of the work piece caused by the blade of the tool is near the resonance frequency of the work piece, the vibration called chattering may be generated which may produce an unsatisfactory machining process.

During a machining process, if the frequency of the vibration of the blade of the tool is near the resonance frequency of the tool, the vibration called chattering may also be generated which may also produce an unsatisfactory machining process. This tends to happen if the tool is long.

In order to prevent the chattering and maintain a satisfactory machining processing, it is required to prevent the vibration of the work piece whose frequency is near the resonance frequency of the machining process or the tool. According to the prior art, this is achieved by decreasing the feed speed and the main spindle rotational speed.

However, the processing time increases if the feed speed and the main spindle rotational speed are decreased during the entire processing. Thus, the feed speed and the main spindle rotational speed are preferably decreased only in some cases out of necessity. A numerical control system is known which comprises a feed speed overriding unit and a main spindle rotational speed overriding unit, as a numerical control system for a machine tool for decreasing the feed speed and the main spindle rotational speed only in some cases depending upon the necessity. In such a control system, the feed speed overriding unit outputs a signal for an overriding control of the feed speed according to an input of a feed speed overriding, and the main spindle rotational speed overriding unit outputs a signal for an overriding control of the main spindle rotational speed according to an input of the main spindle rotational speed overriding.

In the conventional numerical control system as described above, the operator has to manually conduct the input of the feed speed overriding to the feed speed overriding unit and manually conduct the input of the main spindle rotational speed overriding to the main spindle rotational speed overriding unit, while supervising the machining.

For example, the operator conducts overriding inputs in such a manner that the feed speed and the main spindle rotational speed are increased when the machine process starts, and that the feed speed and the main spindle rotational speed are decreased when the resonance occurs and grows during the machine process.

In the overriding inputs, the feed speed and the main spindle rotational speed have to be changed synchronously with each other in order to maintain an even feed of each cutting blade.

However, it is difficult for the operator's manual inputs to change the feed speed and the main spindle rotational speed synchronously with each other, thus, it is difficult to achieve a good processing state. Therefore, the processed surfaces of the work may tend to be uneven. In addition, the operator is over burdened by conducting several manual inputs, so that the operator can only be assigned to work a limited number of machines.

On the other hand, special tools with higher stiffness are available in order to prevent the generation of the chattering. However, the special tools are very expensive.

Therefore, the object of this invention is to provide a numerical control system for a machine tool which can effectively prevent the resonance phenomenon when performing a machining process on a workpiece.

SUMMARY OF THE INVENTION

To achieve the above object, this invention is characterized by the following features. That is, this invention provides a numerical control system for a machine tool comprising: a feed speed setting unit for outputting a signal of a setting feed speed of the machine tool, a feed speed overriding unit for outputting a signal of a feed speed overriding according to an input of the feed speed overriding, a feed speed determining unit connected with the feed speed setting unit and the feed speed overriding unit, for determining a command signal of a feed speed of the machine tool according to the signal of the set feed speed and the signal of the feed speed overriding, a main spindle rotational speed setting unit for outputting a signal of a set main spindle rotational speed of the machine tool, a main spindle rotational speed overriding unit for outputting a signal of a main spindle rotational speed overriding according to an input of the main spindle rotational speed overriding, and a main spindle rotational speed determining unit connected with the main spindle rotational speed setting unit and the main spindle rotational speed overriding unit, for determining a command signal of a main spindle rotational speed of the machine tool according to the signal of the set main spindle rotational speed and the signal of the main spindle rotational speed overriding, wherein the main spindle rotational speed determining unit is connected with the feed speed determining unit, and changes the command signal of the main spindle rotational speed synchronously with the change of the command signal of the feed speed when the command signal of the feed speed is changed at the feed speed determining unit by the signal of the feed speed overriding.

According to the invention, by the main spindle rotational speed determining unit, the command signal of the main spindle rotational speed is changed synchronously with the command signal of the feed speed changed by the signal of the feed speed overriding. Thus, the operator's burden of conducting manual inputs is less than the conventional method. In addition, this invention can achieve an improved processing state in an overriding control state.

This invention also provides a numerical control system for a machine tool comprising; a main spindle rotational speed setting unit for outputting a signal of a setting main spindle rotational speed of the machine tool, a main spindle rotational speed overriding unit for outputting a signal of a main spindle rotational speed overriding according to an input of the main spindle rotational speed overriding, a main spindle rotational speed determining unit connected with the main spindle rotational speed setting unit and the main spindle rotational speed overriding unit, for determining a command signal of a main spindle rotational speed of the machine tool according to the signal of the set main spindle rotational speed and the signal of the main spindle rotational speed overriding, a feed speed setting unit for outputting a signal of a set feed speed of the machine tool, a feed speed overriding unit for outputting a signal of a feed speed overriding according to an input of the feed speed overriding, and a feed speed determining unit connected with the feed speed setting unit and the feed speed overriding unit, for determining a command signal of a feed speed of the machine tool according to the signal of the set feed speed and the signal of the feed speed overriding, wherein the feed speed determining unit is connected with the main spindle rotational speed determining unit, and changes the command signal of the feed speed synchronously with the change of the command signal of the main spindle rotational speed when the command signal of the main spindle rotational speed is changed at the main spindle rotational speed determining unit by the signal of the main spindle rotational speed overriding.

According to the invention, by the feed speed determining unit, the command signal of the feed speed is changed synchronously with the command signal of the main spindle rotational speed changed by the signal of the main spindle rotational speed overriding. Thus, the operator's burden of conducting manual inputs is less than the conventional method. In addition, this invention can achieve an improved processing state in the overriding control state.

BRIEF DESCRIPTION OF THE DRAWINGS

FIG. 3 is a chart showing an example of an overriding pattern.

BEST MODE FOR CARRYING OUT THE INVENTION

Embodiments of the invention will now be described in more detail with reference to FIGS. 1 to 3.

Figure 1:
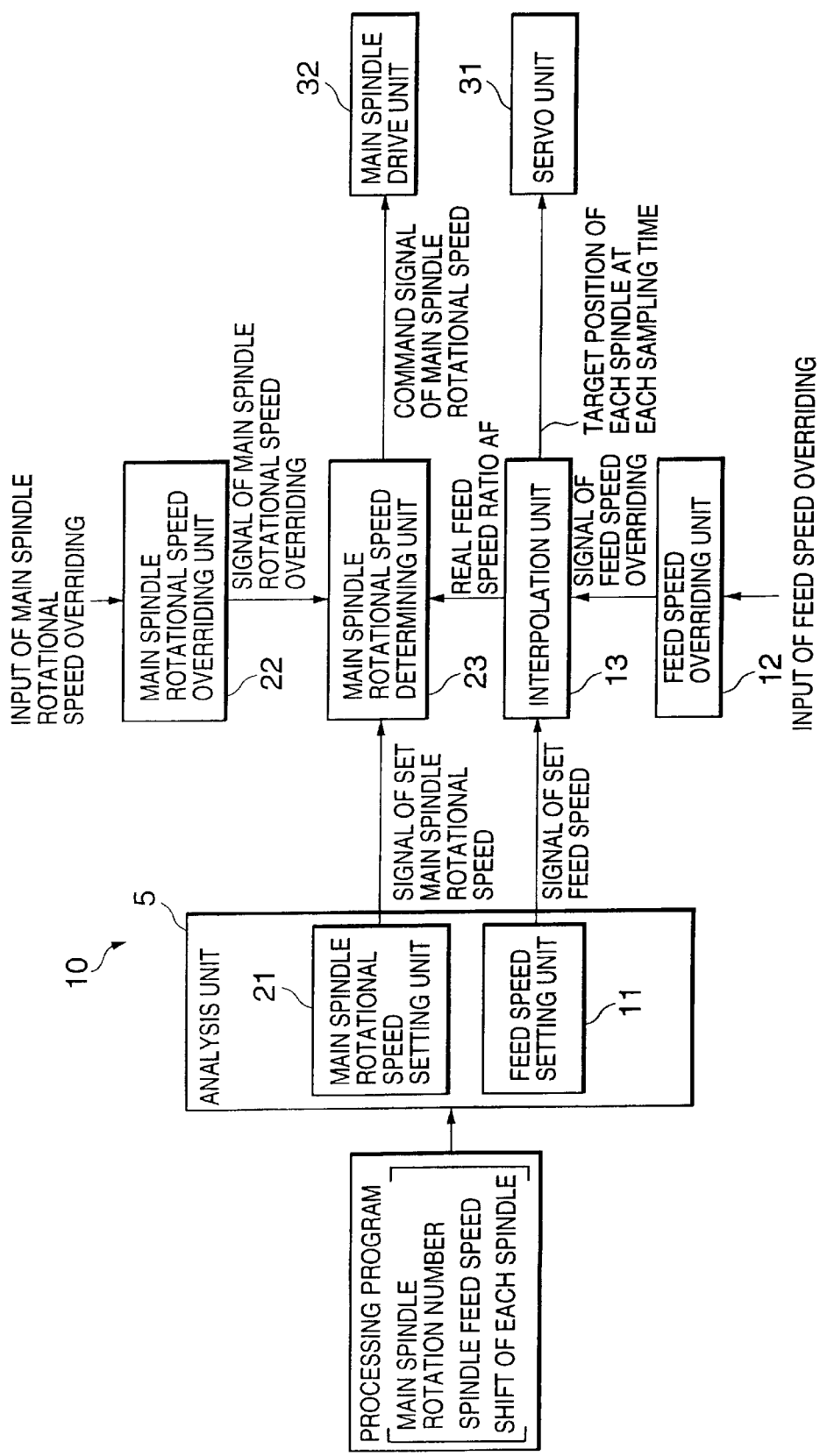
FIG. 1 is a block diagram of a first embodiment of the numerical control system for a machine tool according to the invention.

FIG. 1 shows a first embodiment of the numerical control system for a machine tool according to the invention. As shown therein, the numerical control unit 10 for a machine tool comprises a feed speed setting unit 11 which outputs a signal of set feed speed of the machine tool according to processing programs, and a feed speed overriding unit 12 which outputs a signal of feed speed overriding according to an input of feed speed overriding to the unit 12. An interpolation unit (feed speed determining unit) 13 is connected with the feed speed setting unit 11 and the feed speed overriding unit 12. The interpolation unit 13 determines a command signal of feed speed of the machine tool by interpolation processes according to the signal of set feed speed and the signal of feed speed overriding, and outputs a target position of each spindle at each sampling time.

The numerical control system 10 also comprises a main spindle rotational speed setting unit 21 which outputs a signal of set main spindle rotational speed of the machine tool according to processing programs, and a main spindle rotational speed overriding unit 22 which outputs a signal of main spindle rotational speed overriding according to an input of the main spindle rotational speed overriding to the unit 22. A main spindle rotational speed determining unit 23 is connected with the main spindle rotational speed setting unit 21 and the main spindle rotational speed overriding unit 22. The main spindle rotational speed determining unit 23 determines a command signal of main spindle rotational speed of the machine tool according to the signal of the set main spindle rotational speed and the signal of main spindle rotational speed overriding.

In this case, the feed speed setting unit 11 and the main spindle rotational speed setting unit 21 form an analysis unit 5.

The main spindle rotational speed determining unit 23 is also connected with the interpolation unit 13, and operates to change the command signal of main spindle rotational speed synchronously with a change of the command signal of feed speed when the command signal of feed speed is changed at the interpolation unit 13 by the signal of feed speed overriding. In details, the signal of the main spindle rotational speed overriding is provided as a multiplying coefficient PS (%). The interpolation unit 13 sends a real feed speed ratio AF, which is obtained by dividing the command signal of feed speed by the signal of set feed speed, to the main spindle rotational speed determining unit 23. The main spindle rotational speed determining unit 23 determines the command signal of main spindle rotational speed in such a manner that a speed SC ($min^{-1}$) commanded by the command signal of main spindle rotational speed and a speed S ($min^{-1}$) by the signal of set main spindle rotational speed satisfy the relationship:

$$SC=(PS \times S)/100 \times AF \qquad (1).$$

The interpolation unit 13 is also connected with a servo unit 31, and operates to send a command signal of target position of each spindle of the machine tool at each sampling time to the servo unit 31 according to the determined command signal of feed speed. The main spindle rotational speed determining unit 23 is connected with a main spindle drive unit 32, and operates to send a command signal of main spindle rotational speed to the main spindle drive unit 32 at each sampling time.

The numerical control unit 10 functions as follows. The servo unit 31 and the main spindle drive unit 32 are operated respectively according to the command signal of feed speed and according to the command signal of main spindle rotational speed, which are respectively based on only the signal of set feed speed and only the signal of set main spindle rotational speed in normal state.

If the operator, watching the processing state, determines that an override is necessary he conducts an overriding control operation to generate an input of the feed speed overriding which is fed into the feed speed overriding unit 12. Then the feed speed overriding unit 12 outputs the signal of feed speed overriding toward the interpolation unit 13.

In this case, according to the signal of set feed speed and the signal of feed speed overriding, the interpolation unit 13 conducts the interpolation processes and determines the command signal of feed speed. Then, according to the command signal of feed speed, the interpolation unit 13 outputs a command signal of target position of each spindle at each sampling time to the servo unit 31 to drive the servo unit 31. The interpolation unit 13 sends a real feed speed ratio AF, which is obtained by dividing the command signal of feed speed by the signal of set feed speed, to the main spindle rotational speed determining unit 23. The main spindle rotational speed determining unit 23 determines the command signal of main spindle rotational speed in such a manner that a speed SC ($min^{-1}$) commanded by the command signal of main spindle rotational speed and a speed S ($min^{-1}$) by the signal of set main spindle rotational speed satisfy the above relationship (1). Then the main spindle rotational speed determining unit 23 sends a command signal to drive the main spindle drive unit 32. Thus, the command signal of main spindle rotational speed is changed synchronously with the change of the command signal of feed speed. Therefore, the above overriding input enables the invention to obtain an improved processing state even under overriding control.

According to this embodiment, when the operator conducts an overriding input to the feed speed overriding unit 12, the command signal of the main spindle rotational speed is changed synchronously with the command signal of feed speed change by the signal of overriding feed speed. Thus, the operator is burden of conducting the overriding input is reduced and the quality of the state is improved.

In addition, in this embodiment, the operator can conduct not only the input of the feed speed overriding, but also an input of the main spindle rotational speed overriding to the main spindle rotational speed overriding unit 22.

Figure 2:
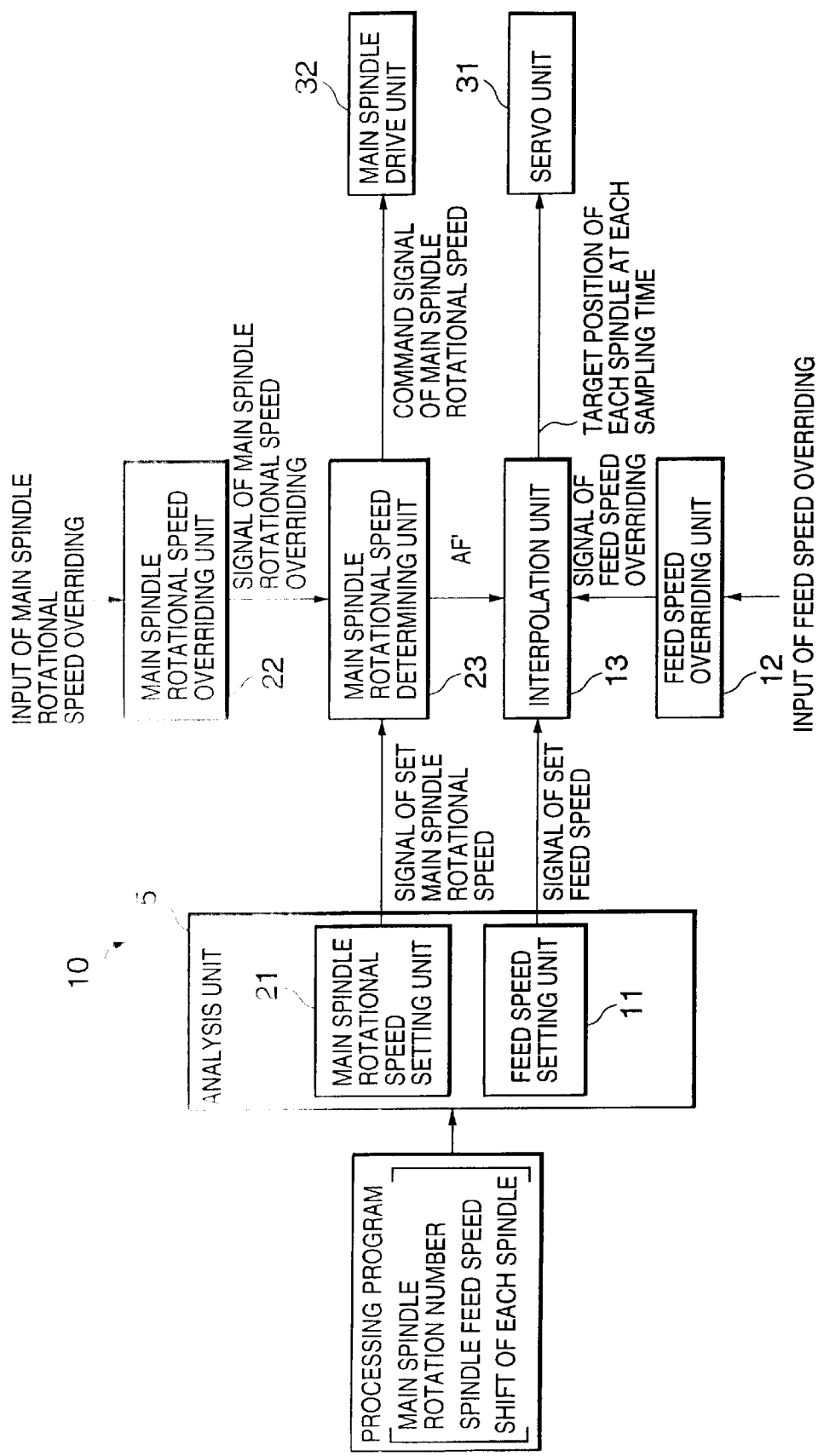
FIG. 2 is a block diagram of a second embodiment of the numerical control system for a machine tool according to the invention.

FIG. 2 shows a second embodiment of the numerical control unit for a machine tool according to the invention. As shown therein, in the second embodiment, the main spindle rotational speed determining unit 23 does not change the command signal of the main spindle rotational speed synchronously with a change of the command signal of the feed speed when the command signal of the feed speed is changed at the interpolation unit 13 by the signal of the feed speed overriding, but the interpolation unit 13 operates to change the command signal of the feed speed synchronously with a change of the command signal of main spindle rotational speed when the command signal of the main spindle rotational speed is changed at the main spindle rotational speed determining unit 23 by the signal of main spindle rotational speed overriding. The other structures of the second embodiment is substantially the same as the components of the first embodiment shown in FIG. 1. In the second embodiment, the same numeral references correspond to the same components as the first embodiment shown in FIG. 1. The explanation of the same structure will not be repeated.

In this embodiment, the signal of feed the speed overriding is provided as a multiplying coefficient PS' (%). The main spindle rotational speed determining unit 23 sends a real main spindle rotational speed ratio AF', which is obtained by dividing the command signal of main spindle rotational speed by the signal of the set main spindle rotational speed, to the interpolation unit 13. The interpolation unit 13 determines the command signal of feed speed in such a manner that a speed SC' ($min^{-1}$) commanded subjected to reduced burdens for the overriding input and a good by the command signal of feed speed and a speed S' ($min^{-1}$) by the signal of set feed speed satisfy the relationship:

SC'=(PS'×S')/100×AF'.

According to this embodiment, when the operator conducts an operation for the overriding input to the main spindle rotational speed overriding unit 22, the command signal of the feed speed is changed synchronously with the command signal of the main spindle rotational speed changed by the signal of overriding the main spindle rotational speed. Thus, the operators burden of conducting overriding inputs is reduced, an improved processing state is achieved.

In addition, in this embodiment, the operator can conduct not only the input of the main spindle rotational speed overriding, but also an input of the feed speed overriding to the feed speed overriding unit 12.

The overriding inputs in the two embodiments described above are substantially manually conducted full by the operator, but could be conducted with overriding patterns.

For example, the feed speed overriding unit 12 can store an overriding pattern shown in FIG. 3 to determine the signal of the feed speed overriding according to the overriding pattern. In FIG. 3, the axis of ordinates indicates an overriding-value (multiplying coefficient with respect to the set feed speed). Similarly, the main spindle rotational speed overriding unit 22 can store an overriding pattern shown in FIG. 3 to determine the signal of main spindle rotational speed overriding according to the overriding pattern.

The overriding pattern is preferably predetermined according to the processing program. The overriding pattern can also be predetermined from the record of inputs conducted by the operator to prevent resonance. The overriding pattern is also preferably variable by setting one or more parameters or by a teaching operation, in order to be suitably modified. For example, the overriding pattern shown in FIG. 3 can be variable by changing any of the four parameters P1, P2, T1 and T2.

According to the overriding control with such an overriding pattern, the operator has to conduct only an input for starting to drive one of the overriding units, as an overriding input. Thus the overriding control is semi-automatic. In addition, the overriding control can be fully automatic by letting the processing program conduct the input for starting to drive one of the overriding units.

What is claimed is:

1. A numerical control system for a machine tool comprising:

a feed speed setting unit for outputting a signal of a set feed speed of the machine tool;

a feed speed overriding unit for receiving a feed overriding input signal and outputting a signal of a feed speed overriding based on the feed speed overriding input signal;

a feed speed determining unit, connected with the feed speed setting unit and the feed speed overriding unit, for receiving the output signals of the feed speed setting unit and the feed speed overriding unit and determining a command signal of a feed speed of the machine tool based on the output signals of the set feed speed setting unit and the feed speed overriding unit;

a main spindle rotational speed setting unit for outputting a signal of a set main spindle rotational speed of the machine tool;

a main spindle rotational speed overriding unit for receiving an input that overrides the main spindle rotational speed and outputting a signal of a main spindle rotational speed overriding unit based on the input that overrides the main spindle rotational speed; and a main spindle rotational speed determining unit, connected with the main spindle rotational speed setting unit and the main spindle rotational speed overriding unit, for receiving the output signals of main spindle rotational speed setting unit and the main spindle rotational speed overriding unit and determining a command signal of a main spindle rotational speed of the machine tool based on the output signals of the main spindle rotational speed setting unit and the signal of the main spindle rotational speed overriding unit; and wherein the main spindle rotational speed determining unit, connected with the feed speed determining unit, for changing the command signal of the main spindle rotational speed synchronously when the output signal of the feed speed overriding unit is received into the feed speed determining unit to change the command signal of the feed speed.

2. A numerical control system for a machine tool comprising:
- a main spindle rotational speed setting unit for outputting a signal of a set main spindle rotational speed of the machine tool;
- a main spindle rotational speed overriding unit for receiving an input signal that overrides the main spindle rotational speed and outputting a signal of a main spindle rotational speed overriding unit based on the input signal that overrides the main spindle rotational speed;
- a main spindle rotational speed determining unit, connected with the main spindle rotational speed setting unit and the main spindle rotational speed overriding unit, for receiving the output signals of the main spindle rotational speed setting unit and the main spindle overriding unit and determining a command signal of a main spindle rotational speed of the machine tool based on the output signals of the main spindle rotational speed setting unit and the signal of the main spindle rotational speed overriding unit;
- a feed speed setting unit for outputting a signal of a set feed speed of the machine tool;
- a feed speed overriding unit for receiving a feed overriding input signal and outputting a signal of a feed speed overriding based on the feed speed overriding input signal;
- a feed speed determining unit, connected with the feed speed setting unit and the feed speed overriding unit, for determining a command signal of a feed speed of the machine tool based on the signal of the feed speed setting unit and the signal of the feed speed overriding unit; and
- wherein the feed speed determining unit, connected with the main spindle rotational speed determining unit, for changing the command signal of the feed speed synchronously when the output signal of the main spindle rotational speed overriding unit is received at the main spindle rotational speed determining unit to change the command signal of the main spindle rotational speed.

3. A numerical control system for a machine tool according to claim 1, wherein:
- the feed speed overriding unit has a storing medium for storing a predetermined overriding pattern input signal received into the feed speed overriding unit, and
- the signal of the feed speed overriding unit is determined based on the input signal of the overriding pattern.

4. A numerical control system for a machine tool according to claim 2, wherein:
- the feed speed overriding unit has a storing medium for storing a predetermined overriding pattern input signal received into the feed speed overriding unit, and
- the signal of the feed speed overriding unit is determined based on the input signal of the predetermined overriding pattern.

5. A numerical control system for a machine tool according to claim 1, wherein:
- the main spindle rotational speed overriding unit has a storing medium for storing a predetermined overriding pattern input signal received into the main spindle rotational speed overriding unit, and
- the signal of the main spindle rotational speed overriding unit is determined based on the input signal of the predetermined overriding pattern.

6. A numerical control system for a machine tool according to claim 2, wherein:
- the main spindle rotational speed overriding unit has a storing medium for storing a predetermined overriding pattern input signal received into the main spindle rotational speed overriding unit, and
- the signal of the main spindle rotational speed overriding unit is determined based on the input signal of the predetermined overriding pattern.

7. A numerical control system for a machine tool according to claim 3, wherein:
- the predetermined overriding pattern is predetermined based on an input received from a processing program connected to the numerical control system.

8. A numerical control system for a machine tool according to claim 4, wherein:
- the predetermined overriding pattern is predetermined based on an input received from a processing program connected to the numerical control system.

9. A numerical control system for a machine tool according to claim 5, wherein:
- the predetermined overriding pattern is predetermined based on an input received from a processing program connected to the numerical control system.

10. A numerical control system for a machine tool according to claim 6, wherein:
- the predetermined overriding pattern is predetermined based on an input received from a processing program connected to the numerical control system.

11. A numerical control system for a machine tool according to claim 3, wherein:
- the predetermined overriding pattern is variable by setting one or more parameters received into the numerical control system.

12. A numerical control system for a machine tool according to claim 4, wherein:
- the predetermined overriding pattern is variable by setting one or more parameters received into the numerical control system.

13. A numerical control system for a machine tool according to claim 5, wherein:
- the predetermined overriding pattern is variable by setting one or more parameters received into the numerical control system.

14. A numerical control system for a machine tool according to claim 6, wherein:
- the predetermined overriding pattern is variable by setting one or more parameters received into the numerical control system.

15. A numerical control system for a machine tool according to claim 3, wherein:
- the predetermined overriding pattern is variable by adjusting a teaching operation connected to the numerical control system.

16. A numerical control system for a machine tool according to claim 4, wherein:
- the predetermined overriding pattern is variable by adjusting a teaching operation connected to the numerical control system.

17. A numerical control system for a machine tool according to claim 5, wherein:
- the predetermined overriding pattern is variable by adjusting a teaching operation connected to the numerical control system.

18. A numerical control system for a machine tool according to claim 6, wherein:
- the predetermined overriding pattern is variable by adjusting a teaching operation connected to the numerical control system.

* * * * *